United States Patent
McGehee

(10) Patent No.: US 7,603,245 B2
(45) Date of Patent: Oct. 13, 2009

(54) BLIND ESTIMATION OF BANDWIDTH AND DURATION PARAMETERS OF AN INCOMING SIGNAL

(75) Inventor: Jared McGehee, Boerne, TX (US)

(73) Assignee: Southwest Research Institute, San Antonio, TX (US)

( * ) Notice: Subject to any disclaimer, the term of this patent is extended or adjusted under 35 U.S.C. 154(b) by 170 days.

(21) Appl. No.: 11/765,924

(22) Filed: Jun. 20, 2007

(65) Prior Publication Data
US 2008/0010040 A1 Jan. 10, 2008

Related U.S. Application Data

(60) Provisional application No. 60/805,279, filed on Jun. 20, 2006.

(51) Int. Cl.
*G06F 19/00* (2006.01)
*G06F 15/00* (2006.01)

(52) U.S. Cl. .......................... 702/66; 702/189
(58) Field of Classification Search ............ 702/66, 702/75, 76, 182, 189
See application file for complete search history.

(56) References Cited

U.S. PATENT DOCUMENTS

| | | | |
|---|---|---|---|
| 6,351,729 B1 | 2/2002 | Thomson | 704/206 |
| 6,690,746 B1 | 2/2004 | Sills et al. | 375/316 |
| 6,699,189 B1 | 3/2004 | Lin et al. | 600/437 |
| 6,711,528 B2 | 3/2004 | Dishman et al. | 702/189 |
| 6,931,362 B2 | 8/2005 | Beadle et al. | 702/190 |
| 2003/0204378 A1 | 10/2003 | Cai | 702/189 |
| 2003/0204380 A1* | 10/2003 | Dishman et al. | 702/189 |
| 2004/0076112 A1 | 4/2004 | Chen | 370/208 |
| 2007/0254590 A1* | 11/2007 | Lopez | 455/63.1 |

OTHER PUBLICATIONS

Xu, Zhengyuan, "Blind Channel Estimation via Subspace Approximation," Department of Electrical Engineering, University of California, IEEE, pp. 1653-1657, 2003.
Beres, Elzbieta, et al., "Blind Channel Estimation for Orthogonal STBC in MISO Systems," IEEE Transactions on Vehicular Technology, vol. 56, No. 4, pp. 2042-2050, Jul. 2007.

* cited by examiner

*Primary Examiner*—Bryan Bui
(74) *Attorney, Agent, or Firm*—Baker Botts LLP

(57) ABSTRACT

A method and system for blind estimation of time and frequency parameters of an incoming signal. A spectrogram of the signal is processed using singular value decomposition (SVD) and ICA (independent component analysis) techniques. Time and frequency parameters are estimated from time and frequency eigenvectors, respectively.

4 Claims, 1 Drawing Sheet

BLIND ESTIMATION OF BANDWIDTH AND DURATION PARAMETERS OF AN INCOMING SIGNAL

RELATED PATENT APPLICATION

This application claims the benefit of U.S. Provisional Application No. 60/805,279, filed Jun. 20, 2006 and entitled "BLIND ESTIMATION OF BANDWIDTH AND DURATION PARAMETERS OF AN INCOMING SIGNAL."

TECHNICAL FIELD OF THE INVENTION

This invention relates to signal processing, and more particularly to estimating bandwidth and frequency parameters of an unknown incoming signal.

BACKGROUND OF THE INVENTION

"Blind" signal detection generally involves receiving and decoding incoming signals when the signal type is not known to the receiver. Many fields of science deal with this type of signal detection, and various techniques have been developed to identify an incoming signal of unknown type, so that its parameters, such as its modulation type and baud rate, can be known and used to decode the signal.

Several examples of signal recognition techniques are parameter-based algorithms, pattern recognition, algorithms that exploit cyclostationarity characteristics, and neural networks. U.S. Pat. No. 6,690,746, entitled "Signal Recognizer for Communications Signals", assigned to Southwest Research Institute, discusses a system and method for classifying incoming signals as being one of a variety of signal types. Signal parameters are estimated and signals are demodulated in accordance with the estimated parameters.

A classic problem in signal detection is referred to as blind source separation, which involves detecting individual source signals from a signal containing a composite of signals. Two processing tools conventionally used for blind signal detection, based on higher-order (above second order) statistical analysis, are singular value decomposition (SVD) and independent components analysis (ICA), typically applied to spectrograms. SVD is a method of reducing the dimensionality of data while retaining maximum information content, and decomposes a spectrogram into a sum of vector outer products with vectors representing both the basis functions (eigenvectors) and the projected features (eigen coefficients). The basis functions and coefficients can be combined to form an eigenspectra, which are spectrograms that contain subsets of the original information. ICA can be used to perform a transformation of the SVD basis functions, yielding maximum separation of features.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
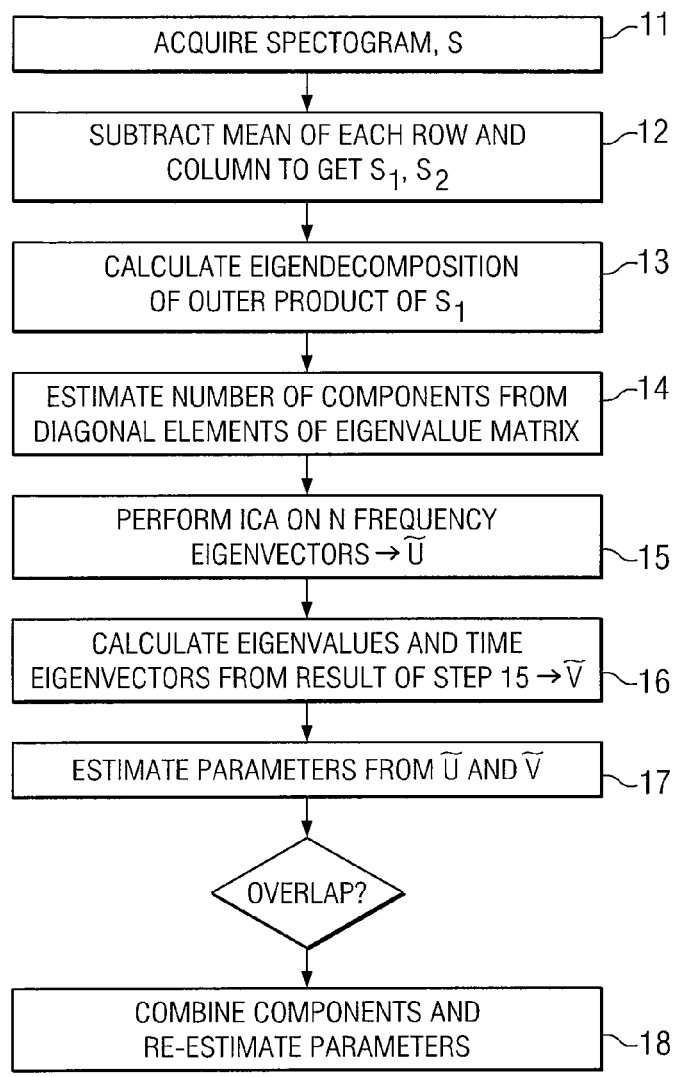
FIG. 1 illustrates a method of estimating signal duration and bandwidth in accordance with the invention.

As explained below, the following description is directed to blind estimation of bandwidth and time parameters of an incoming signal of unknown signal type. The processing is "blind" in the sense that information about the signal(s) within the composite signal is unknown.

The bandwidth and duration parameters may be determined regardless of other signal characteristics, such as how the signal is modulated and whether it is digital or analog. The parameters are estimated for all signals present in an incoming waveform that is a composite of multiple signals.

The method and system described here are based on applying SVD and ICA processing techniques to a spectrogram representing a composite incoming signal. As compared to other methods of spectrogram analysis using SVD and ICA, not simply a signal, but a set of signal parameters is detected. Frequencies of independent sub-components of the incoming signal may also be estimated.

A typical application of the method is at the "front end" of a signal recognition system. Once the bandwidth and duration parameters are known, the signal can be further processed and classified (identified as a particular type of signal). The classification process can be narrowed, other parameters can be determined, and the signal encoded. For example, if the signal is of short duration, i.e., less than one second, the classification process can be narrowed to certain signals, such as "burst" type signals. On the other hand, for a signal such as a broadcast radio signal, the duration may be for an entire sampling period.

Assume S is a (F×T) spectrogram with frequency (row) indices f and time (column) indices t. The goal is to estimate the time and frequency characteristics of each signal contained in the spectrogram.

The values to be estimated are:

$$\left. \begin{array}{l} f_{min} \equiv \text{Lower frequency boundary} \\ f_{max} \equiv \text{Upper frequency boundary} \end{array} \right\} \text{Bandwidth} = f_{max} - f_{min}$$

$f_c \equiv$ Carrier frequency $t_{min} \equiv$ Up time $t_{max} \equiv$ Down time The difference between the up time and down time is the signal duration.

Additionally, it is desirable to estimate these values for any sub-components, e.g. the individual tones in a FSK signal. The entire process, however, is blind. The only assumption that is made is that there is at least one signal in the spectrogram.

As explained in further detail below, the detection method described herein uses a mathematical technique known as singular value decomposition (SVD). In linear algebra, SVD is a factorization of a rectangular real or complex matrix, with applications in signal processing and statistics. SVD can be seen as a generalization of a spectral theorem, which says that certain matrices can be diagonalized using a basis of eigenvectors, to arbitrary matrices.

For purposes of this description, the SVD decomposes the spectrogram, S, into three matrices:

$$S = UEV^T$$

where U is a matrix of frequency eigenvectors, E is a matrix of eigenvalues, and V is a matrix of time eigenvectors. The columns of U are the orthonormal eigenvectors that span the frequency space, the columns of V are the orthonormal eigenvectors that span the time space, and E is a diagonal matrix of the eigenvalues associated with each time/frequency eigenvector pair.

From the distribution of eigenvalues, the number of spectrogram components N is estimated. The N most significant eigenvectors (corresponding to the largest eigenvalues) are used to estimate the time and frequency characteristics outlined above. Subtracting the mean in one direction or the other improves the SVD computation.

In practice, each eigenvector contains a mixture of all N components. A technique called independent components analysis (ICA) operating on the N significant eigenvectors will adequately separate the mixtures. Because the time eigenvectors are much noisier, ICA is performed on the frequency eigenvectors. From the result of the ICA, the eigenvalues and time eigenvectors are re-calculated.

FIG. 1 illustrates the steps of a method for estimating time and frequency parameters of a signal in accordance with the invention. Step 11 is acquiring a spectrogram of the incoming signal.

Step 12 is subtracting the mean of each row and column (representing time, T, and frequency, F) from the spectrogram, S. The results are two new spectrograms, $S_1$ and $S_2$, representing the results of Step 12 for time values and frequency values, respectively.

Step 13 is the SVD process, performed by calculating the eigendecomposition ($S_1 S_1^T$) (where T represents a transpose) of the outer product of $S_1$ (the spectrogram representing the result of Step 12 for the time values).

Step 14 is estimating the number of components, N, from the diagonal elements of E. As stated above, E is a matrix of eigenvalues.

Step 15 is performing ICA on the N most significant frequency eigenvectors from U, the eigenvectors that span the frequency space. The result is a "modified" matrix of frequency eigenvectors, $\tilde{U}$.

Step 16 is calculating the eigenvalues and time eigenvectors from the matrix resulting from Step 15. The result is a modified matrix of eigenvalues, $\tilde{E}$, and a modified matrix of time eigenvectors, $\tilde{V}$.

Step 17 is estimating the upper and lower frequency boundaries, the carrier frequency, and the up and down times for each column of $\tilde{U}$ and $\tilde{V}$.

Specifically, the values $f_{min}$, $f_{max}$, and $f_c$ are calculated from the frequency eigenvectors. The first two values correspond to indices where the eigenvector value crosses a suitably chosen threshold. If multiple pairs of crossings are found, the pair that defines the largest portion of energy is chosen. The third value is computed from a weighted average of the eigenvector values over the range defined by the threshold crossings.

The values $t_{min}$ and $t_{max}$ are calculated from the time eigenvectors. They correspond to values that cross a threshold in the upward and downward direction. Multiple pairs of crossings separated by a configurable amount of time are treated as separate signals. Due to the noisiness of time data, it is smoothed with an averaging or median filter prior to estimating the edges.

Step 18 is performed if there are overlapping time or frequency values. If any of the estimated time or frequency values overlap, these components are combined and the time or frequency values re-estimated. In this manner, multi-component signals such as FSK are reported as one.

The steps of the method of FIG. 1 may be further expressed mathematically as:

Step 12. Subtract the mean of each row and column from the spectrogram $$S_1 = S - \text{mean}(S, 2) \otimes \text{ones}(1, T)$$

$$S_2 = S - \text{mean}(S, 1) \otimes \text{ones}(F, 1)$$

Step 13. Compute the eigendecomposition of the outer product of $S_1$ $$S_1 S_1^T = U E^2 U^T$$

Step 14. Estimate the number of components N from the diagonal elements of E

Step 15. Perform ICA on the N most significant frequency eigenvectors from U $$\tilde{U} = ICA\{U(:,1:N) \cdot E(1:N,1:N)\}$$

Step 16. Calculate the eigenvalues and time eigenvectors from $\tilde{U}$ $$\tilde{E} = \sqrt{\tilde{U}^T S_1 S_1^T \tilde{U}}$$

$$\tilde{V} = (\tilde{E}^{-1} \tilde{U}^T S_2)^T$$

Step 17. Estimate $[f_{min}, f_{max}, f_c, t_{min}, t_{max}]$ for each column of $\tilde{U}$ and $\tilde{V}$ $$U_{thresh}[i] = \frac{1}{2} \sqrt{\frac{\tilde{E}(1) \cdot \tilde{U}(:,i)^T \cdot \tilde{U}(:,i)}{F \cdot \tilde{E}(i)}}$$

$$V_{thresh}[i] = \frac{1}{2} \sqrt{\frac{\tilde{V}(:,i)^T \cdot \tilde{V}(:,i)}{T}}$$

Figure 2:
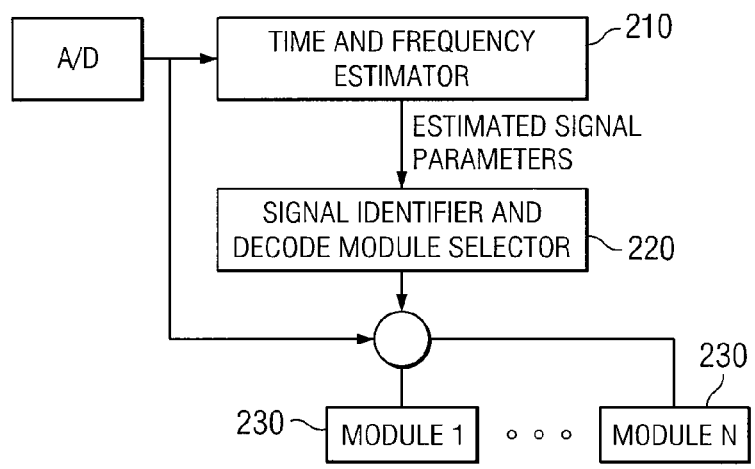
FIG. 2 illustrates an example of a signal detection system that incorporates a time and frequency parameter estimator in accordance with the method of FIG. 1.

Step 18. Combine components based on overlapping time/frequency values and re-estimate time/frequency values of combined result FIG. 2 illustrates an example of a signal detection system 200 that incorporates a time and frequency parameter estimator 210 in accordance with the invention. The incoming signal is sampled and delivered to estimator 210, where it is processed as described above.

As explained above, once time and frequency (duration and bandwidth) parameters are obtained, an intelligent decision can be made for the most efficient subsequent processing of the signal. For example, a module selector 220 may be used to determine whether the parameters indicate that the signal is of a certain type. The signal data may be delivered to a decode module 230 designed for that signal. If each module is designed for a different type of signal, n different types of signals may be detected and decoded.

The processing elements of FIG. 2 may be implemented with appropriate processing devices, programmed to perform the method described herein.

What is claimed is:

1. A processing system for detecting bandwidth and duration parameters of at least one signal of interest in an incoming signal, comprising:
   memory for storing a spectrogram of the incoming signal;
   a time and frequency parameter estimator programmed to perform the following operations:

subtracting the mean of each row and column from the spectrogram, thereby obtaining a first spectrogram for time values and a second spectrogram for frequency values;

calculating an eigendecomposition of the square matrix formed from the product of the first spectrogram times itself transposed, thereby obtaining a matrix of eigenvalues and a matrix of frequency eigenvectors;

estimating the N number of spectrogram components from the matrix of eigenvalues;

performing an ICA on the N most significant eigenvectors from the matrix of frequency eigenvectors, thereby obtaining a modified matrix of frequency eigenvectors;

calculating eigenvalues and time eigenvectors from the modified matrix of frequency eigenvectors, thereby obtaining modified matrices of eigenvalues and time eigenvectors;

calculating frequency parameters from the modified matrices of frequency eigenvectors and eigenvalues; and calculating time parameters from the modified matrix of time eigenvectors.

2. The system of claim 1, wherein the incoming signal is a composite signal.

3. The system of claim 2, wherein the step of calculating frequency parameters and time parameters are performed for more than one signal of interest.

4. The system of claim 1, further comprising a signal identifier for identifying the signal, based on the frequency parameters and time parameters.

* * * * *